US008029891B2

(12) United States Patent
Phillips et al.

(10) Patent No.: US 8,029,891 B2
(45) Date of Patent: *Oct. 4, 2011

(54) NANOPARTICULATE SOLAR CONTROL CONCENTRATES

(75) Inventors: Thomas R. Phillips, Vienna, WV (US); Richard A. Fugiel, Long Grove, IL (US); Richard Alan Hayes, Beaumont, TX (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 356 days.

This patent is subject to a terminal disclaimer.

(21) Appl. No.: 11/141,538

(22) Filed: May 31, 2005

(65) Prior Publication Data

US 2006/0269739 A1 Nov. 30, 2006

(51) Int. Cl.
*B32B 5/16* (2006.01)
*B32B 9/04* (2006.01)
*B32B 27/36* (2006.01)
*B32B 27/00* (2006.01)

(52) U.S. Cl. ............... 428/323; 428/328; 428/411.1; 428/412; 428/423.1; 428/426; 428/430; 428/435; 428/474.4; 428/480; 428/500

(58) Field of Classification Search ............... None
See application file for complete search history.

(56) References Cited

U.S. PATENT DOCUMENTS

| 5,518,810 | A | 5/1996 | Nishihara et al. |
| 5,529,720 | A | 6/1996 | Hayashi et al. |
| 5,830,568 | A | 11/1998 | Kondo |
| 5,886,075 | A | 3/1999 | Keane et al. |
| 6,261,684 | B1 * | 7/2001 | Takahashi et al. ............ 428/345 |
| 6,315,848 | B1 | 11/2001 | Kondo |
| 6,329,061 | B2 | 12/2001 | Kondo |
| 6,506,487 | B2 | 1/2003 | Nagai |
| 6,579,608 | B1 | 6/2003 | Kondo |
| 6,620,477 | B2 | 9/2003 | Nagai |
| 6,620,872 | B2 | 9/2003 | Fisher |
| 6,632,274 | B2 | 10/2003 | Kawamoto et al. |
| 6,673,456 | B1 | 1/2004 | Kobata et al. |
| 6,686,032 | B1 | 2/2004 | Nagai |
| 6,733,872 | B2 | 5/2004 | Nagai |
| 7,759,414 | B2 * | 7/2010 | Hayes et al. ................. 523/351 |
| 2004/0028920 | A1 | 2/2004 | Fujita et al. |

FOREIGN PATENT DOCUMENTS

EP 1 227 070 A1 7/2002

OTHER PUBLICATIONS

PCT International Search Report and Written Opinion for International Application No. PCT/US2006/020717 dated Dec. 11, 2007.

* cited by examiner

*Primary Examiner* — Sheeba Ahmed
(74) *Attorney, Agent, or Firm* — Maria M. Kourtakis; Kelly Law Registry

(57) ABSTRACT

Provided are compositions comprising infrared absorptive inorganic nanoparticles and a matrix material and methods to produce the compositions. The infrared absorptive inorganic nanoparticles preferably include antimony tin oxide (ATO), indium tin oxide (ITO), or mixtures thereof. Also provided are polymer blends, polymeric films and sheets, solar control laminates, and processes to produce the polymer blends, polymeric films and sheets and solar control laminates.

8 Claims, No Drawings

NANOPARTICULATE SOLAR CONTROL CONCENTRATES

BACKGROUND OF THE INVENTION

1. Field of the Invention

The present invention pertains to the field of materials that reduce the transmission of radiation, and particularly to blends of polymeric and inorganic materials that reduce the transmission of infrared light.

2. Description of the Related Art

Several patents and publications are cited in this description in order to more fully describe the state of the art to which this invention pertains. The entire disclosure of each of these patents and publications is incorporated by reference herein.

Glass laminated products or "safety glass" have contributed to society for almost a century. Safety glass is characterized by high impact and penetration resistance, and by minimal scattering of glass shards and debris upon shattering. The laminates typically consist of a sandwich of an interlayer that is a polymeric film or sheet, and that is placed between two glass sheets or panels. One or both of the glass sheets may be replaced with optically clear rigid polymeric sheets such as, for example, sheets of polycarbonate materials. Safety glass has further evolved to include more than two layers of glass and/or polymeric sheets bonded together with more than one interlayer.

The interlayer is typically made with a relatively thick polymer film or sheet that exhibits toughness and adheres to the glass in the event of a crack or crash. Over the years, a wide variety of polymeric interlayers have been developed for glass laminated products. In general, it is desirable that these polymeric interlayers possess acceptable levels of: optical clarity, impact resistance, penetration resistance, ultraviolet light resistance, long term thermal stability, adhesion to glass and/or other rigid polymeric sheets, ultraviolet light transmittance, moisture absorption, moisture resistance, long term weatherability, and haze of less than 4%, among other characteristics.

Widely used interlayer materials include complex multicomponent compositions comprising polymers such as: polyvinylbutyral (PVB); polyurethane (PU); polyvinylchloride (PVC); metallocene-catalyzed linear low density polyethylenes (mPE); ethylenevinyl acetate (EVA); ethylene acid copolymer ionomers; polymeric fatty acid polyamides; polyester resins such as poly(ethylene terephthalate) (PET); silicone elastomers; epoxy resins; elastomeric polycarbonates; and the like. Acid copolymers have become more widespread in their use for fabricating transparent laminates.

Beyond the well known safety glass commonly used in automotive windshields, glass laminates are incorporated as windows into trains, airplanes, ships, and nearly every other mode of transportation. The architectural use of safety glass has also expanded rapidly in recent years, as designers incorporate more glass surfaces into buildings. In addition to their desirable aesthetic features, glass laminated products have now attained the strength required for weight bearing structures such as, for example, the glass staircases featured in many newer buildings.

The newer safety glass products are also designed to resist natural and man made disasters. Examples include the recent development of the hurricane resistant glass that is now mandated in many hurricane susceptible areas, theft resistant glazings, and blast resistant glass laminated products. These products have enough strength to resist intrusion even after the frangible portion of the laminate has been broken, for example by high force winds, or by impact of flying debris, or by a criminal attempting to break into a structure.

Society continues to demand more functionality from laminated glass products beyond its optical and decorative capabilities and the safety characteristics described above. One desirable goal is the reduction of energy consumption within structures, such as automobiles or buildings, for example, through the development of solar control glazing. Because the near infrared spectrum is not sensed by the human eye, a typical approach has been to develop glass laminates that prevent a portion of solar energy from the near infrared spectrum from entering the structure. For example, the energy expended on air conditioning may be reduced, without a reduction or distortion of the transmitted visible light spectrum, in structures equipped with solar control windows that block a portion of the near infrared spectrum.

Solar control in glass laminates may be achieved through modification of the glass or of the polymeric interlayer, by the addition of further solar control layers, or combinations of these approaches. One form of solar control laminated glass includes metallized substrate films, such as polyester films, which have electrically conductive metal layers, such as aluminum or silver metal, typically applied through a vacuum deposition or a sputtering process. The metallized films generally reflect light of the appropriate wavelengths to provide adequate solar control properties. Metallized films, however, are commonly manufactured by vacuum deposition or sputtering processes that require a high vacuum apparatus and a precision atmosphere controlling system.

In addition to infrared light, metallized films also reflect certain radio wavelengths, thus impairing the function of radio, television, global positioning systems (GPS), automated toll collection, keyless entry, communication systems, automatic garage openers, automated teller machines, radio frequency identification (RFID), and like systems commonly used in automobiles or other structures that may be protected by solar control laminated glass. This impairment is a direct result of the metal layers being continuous and, therefore, electrically conductive.

Finally, moisture intrusion into sputtered metal coated films during and after the glass lamination process requires additional, complicated processes to allow for edge deletions from the interlayer. To overcome these problems and others, metallized films have been used as inner layers in laminated glass structures. This type of structure also forces a complication of the manufacturing processes, however.

A more recent trend has been the use of metal oxide nanoparticles that absorb rather than reflect infrared light. To preserve the clarity and transparency of the substrate, these materials ideally have nominal particle sizes below about 200 nanometers (nm). Because these materials do not form electrically conductive films, the operation of radiation transmitting and receiving equipment located inside structures protected by this type of solar control glazing is not impeded.

Some infrared absorbing metal oxides that have attained commercial significance are antimony tin oxide and indium tin oxide. Several film substrates coated with antimony tin oxide and indium tin oxide have been described as solar control window coverings. See, for example, U.S. Pat. No. 5,518,810. The metal oxide particles may be adhered to windows with a thin layer of contact adhesive. See, for example, U.S. Pat. Nos. 6,191,884; 6,261,684 and 6,528,156. In addition, U.S. Pat. No. 6,663,950 describes a hardcoat layer comprising a resin binder including antimony tin oxide nanoparticles and lanthanum hexaboride nanoparticles.

Window coverings, however, including solar control window coverings, suffer the shortcomings of being unstable to aging and environmental stresses such as cleaning, for example. Over time they may develop scratches or stress cracks on the film. They may also form bubbles or otherwise develop partial or total lack of adhesion to the window from, for example, humidity, heat or both.

Therefore, antimony tin oxide nanoparticles and indium tin oxide nanoparticles have been incorporated into the polymeric interlayers of glass laminates. Generally, the nanoparticles are introduced into the polymeric materials as a dispersion in a vehicle such as a plasticizer, a solvent, or another liquid. Alternatively, ultrafine metal oxide particles have been introduced directly into a polymer melt at the end concentration desired for the infrared absorbing interlayer. See, for example, U.S. Pat. Nos. 5,830,568; 6,315,848; 6,329,061; 6,579,608; 6,506,487; 6,620,477; 6,686,032; 6,632,274; 6,673,456; and 6,733,872; and Internatl. Appln. Publn. No. WO 02/060988.

It remains desirable, however, to provide new materials that reduce transmission of infrared energy without impeding radio frequency transmission. It remains desirable to provide infrared blocking materials that do not require plasticizers or other optional ingredients, and that can be used to produce laminates having very good clarity or low haze. It also remains desirable to provide simplified processes for compounding these materials.

SUMMARY OF THE INVENTION

Accordingly, the present invention provides new materials that reduce transmission of infrared energy without impeding radio frequency transmission. No plasticizers or other optional ingredients are required, and the resulting laminates have very good clarity or low haze. Also provided are simplified processes for compounding these materials.

Specifically, in a first embodiment, the invention provides a nanoparticulate solar control concentrate comprising inorganic infrared absorbing nanoparticles and a matrix material. Also provided is a method of making the nanoparticulate solar control concentrate.

In another embodiment, the invention provides polymer blends and shaped articles such as sheets, films, and solar control laminates comprising the nanoparticulate solar control concentrate. Also provided is a method of making the polymer blends and the shaped articles.

DETAILED DESCRIPTION OF THE INVENTION

The definitions herein apply to the terms as used throughout this specification, unless otherwise limited in specific instances.

The term "nanoparticles", as used hereinafter, refers to infrared absorptive inorganic nanoparticles.

The term "solar control", as used herein, refers to reducing the intensity of any wavelength of light emitted by the sun. Preferably, in present invention, the intensity of an infrared or near infrared wavelength is reduced. Also preferably, the intensity of visible wavelengths is substantially unchanged. Advantageously, under these two preferred conditions, the transmission of heat is reduced, while visual transparency is maintained and the appearance of colored objects is not substantially distorted.

The terms "finite amount" and "finite value", as used herein, refer to an amount or value that is not equal to zero.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors that will be apparent to those of skill in the art. In general, an amount, size, formulation, parameter or other quantity or characteristic is "about" or "approximate" whether or not expressly stated to be such.

In one aspect, the present invention provides nanoparticulate solar control concentrate compositions comprising infrared absorptive inorganic nanoparticles dispersed in a matrix material.

The infrared inorganic absorptive nanoparticles preferably comprise a metal, a metal containing compound, a metal containing composite, or a mixture of two or more substances selected from metals, metal containing compounds, and metal containing composites. Suitable metals include, without limitation, tin, zinc, zirconium, iron, chromium, cobalt, cerium, indium, nickel, silver, copper, platinum, manganese, tantalum, tungsten, vanadium, antimony, and molybdenum. Suitable metal containing compounds include, without limitation, metal oxides, metal nitrides, metal oxynitrides, and metal sulfides. Suitable metal containing composites include metals doped with at least one doping substance and metal containing compounds doped with at least one doping substance. Suitable doping substances include, without limitation, antimony, antimony compounds, fluorine, fluorine compounds, tin, tin compounds, titanium, titanium compounds, silicon, silicon compounds, aluminum and aluminum compounds.

Suitable nanoparticles have a nominal or average particle size of less than about 200 nanometers (nm). Preferably, the nanoparticles have a nominal particle size of less than about 100 nm. More preferably, the nanoparticles have a nominal particle size of less than about 50 nm. Still more preferably, the nanoparticles have a nominal particle size of less than about 30 nm. Still more preferably, the nanoparticles have a nominal particle size within the range of about 1 nm to about 20 nm.

Preferably, the nanoparticles comprise antimony tin oxide (ATO), indium tin oxide (ITO), or mixtures thereof. More preferably, the nanoparticles consist essentially of antimony tin oxide (ATO), indium tin oxide (ITO), and mixtures thereof.

Antimony tin oxide can be described as antimony-doped tin oxide, or as tin oxide containing a relatively small amount of antimony oxide. The antimony level is preferably in the range of about 0.1 weight percent to about 20 weight percent based on the total weight of the antimony tin oxide. More preferably, the antimony level is in the range of about 5 weight percent to about 15 weight percent based on the total weight of the antimony tin oxide. Still more preferred is tin oxide doped to a level in the range of about 8 weight percent to about 10 weight percent with antimony oxide.

Indium tin oxide, in contrast, can be described as tin-doped indium oxide, or as indium oxide containing a relatively small amount of tin oxide. The tin level is preferably in the range of from about 1 to about 15 atomic percent and more preferably from about 2 to about 12 atomic percent based on the sum of tin and indium atoms. Alternatively stated, the molar fraction of the tin content in the ITO powder, (moles Sn)/[(moles Sn)+(moles In)], is preferably from about 0.01 to about 0.15. More preferably, the molar fraction of the tin content is from about 0.02 to about 0.12.

The ATO and ITO nanoparticles may be produced through any suitable process, including, for example, vapor phase decomposing methods, plasma vaporizing methods, alkoxide decomposing methods, co-precipitation methods, hydrothermal methods, and the like.

Subject to the process considerations set forth below, the amount of nanoparticles incorporated into the matrix material to form the nanoparticulate solar control concentrate may range from about 30 to about 80 weight percent, preferably from about 30 to about 50 weight percent, and more preferably from about 35 to about 45 weight percent, based on the combined weight of the nanoparticles and the matrix material.

The matrix material into which the nanoparticles are incorporated is preferably a polymer. Essentially any polymer may find utility as the matrix material of the present invention. Preferably, the matrix material is transparent to visible light.

Preferred polymeric matrix materials include, without limitation, poly(ethylene terephthalate), polycarbonate, polypropylene, polyethylene, cyclic polyolefins, norbornene polymers, polystyrene, syndiotactic polystyrene, styrene-acrylate copolymers, acrylonitrile-styrene copolymers, poly(ethylene naphthalate), polyethersulfone, polysulfone, polyamides, including nylons, poly(urethanes), acrylics, cellulose acetates, cellulose triacetates, vinyl chloride polymers, polyvinyl fluoride, polyvinylidene fluoride, poly(ethylene-co-vinyl acetate); ethyl acrylic acetate (EM); ethyl methacrylate (EMAC); metallocene-catalyzed polyethylene; plasticized poly(vinyl chloride); ISD resins; polyurethane; acoustically modified poly(vinyl chloride), an example of which is commercially available from the Sekisui Company; plasticized poly(vinyl butyral); acoustically modified poly(vinyl butyral); and the like and copolymers thereof and combinations thereof.

Preferably, the nanoparticulate solar control concentrate compositions include one or more dispersants for stabilization. The amount of dispersant required is dependent on, for example, the surface characteristics of the nanoparticles, the identity of the matrix material, and the milling techniques used. Preferably, however, the dispersant level is within the range of about 0 to about 10 weight percent based on the total weight of the nanoparticulate solar control concentrate composition.

One or more surfactants are also preferably included in the nanoparticulate solar control concentrate compositions, to reduce the surface tension of the nanoparticles. Suitable surfactants include anionic, nonionic and cationic surfactants. Preferred surfactant loadings may be within the range of about 0 to about 5 weight percent based on the total weight of the nanoparticulate solar control concentrate composition.

One or more plasticizers are also preferably included in the nanoparticulate solar control concentrate compositions, to improve processability or mechanical properties, or to reduce the rattle or rustle of films and sheets comprising the nanoparticulate solar control concentrate compositions. Essentially any plasticizer is suitable for use in the present invention.

The nanoparticulate solar control concentrate compositions preferably include at least one chelating agent. The chelating agents may be EDTA, beta-diketones, such as acetylacetone, trifluoroacetylacetaone, benzoyltrifluororacetone, dipibaroylmethane, and the like, as described in European Patent No. 1 227 070 A1. The level of chelating agent may be a finite amount up to about 2 weight percent, and preferably is a finite amount up to about 1 weight percent, based on the total weight of the nanoparticulate solar control concentrate composition.

The nanoparticulate solar control concentrate compositions also preferably include a finite amount up to about 10.0 weight percent of one or more thermal stabilizers, based on the total weight of the composition. Essentially any thermal stabilizer will find utility within the present invention. More preferably, the compositions include a finite amount up to about 5.0 weight percent, and, still more preferably, a finite amount up to about 1.0 weight percent of thermal stabilizers, based on the total weight of the nanoparticulate solar control concentrate composition.

The nanoparticulate solar control concentrate compositions preferably include a finite amount up to about 10.0 weight percent of one or more UV absorbers, based on the total weight of the composition. Essentially any UV absorber will find utility within the present invention. More preferably, the compositions include a finite amount up to about 5.0 weight percent, and still more preferably, a finite amount up to about 1.0 weight percent UV absorbers, based on the total weight of the nanoparticulate solar control concentrate composition.

Preferably, the nanoparticulate solar control concentrate compositions also include an effective amount of one or more hindered amine light stabilizers (HALS). Generally, HALS are secondary or tertiary, acetylated, N-hydrocarbyloxy substituted, hydroxy substituted N-5 hydrocarbyloxy substituted, or other substituted cyclic amines which further incorporate steric hindrance, typically derived from aliphatic substitution on the carbon atoms adjacent to the amine function. Essentially any HALS may find utility within the present invention. The nanoparticulate solar control concentrate compositions preferably include from about 0 to about 10.0 weight percent of HALS, more preferably from about 0 to about 5.0 weight percent, and still more preferably from about 0 to about 1.0 weight percent of HALS, based on the total weight of the nanoparticulate solar control concentrate.

The nanoparticulate solar control concentrates may also comprise other additives including, without limitation, processing aides; flow enhancing additives; lubricants; pigments; colorants; dyes; flame retardants; antioxidants; nucleating agents to increase crystallinity; slip agents; antiblocking agents such as silica; impact modifiers, such as RMR™ isoprene-butadiene-isoprene resin commercially available from the Mobil Chemical Company; UV stabilizers; crosslinking agents; hardening agents; pH adjusting agents; antifoaming agents; wetting agents; coupling agents of the silane, titanium, aluminum, zirconium or magnesium types; adhesives; primers; and the like. Suitable levels of these additives and methods of incorporating the additives into polymer compositions will be available to those of skill in the art. See, for example, "Modern Plastics Encyclopedia", McGraw-Hill, New York, N.Y. 1995.

In another embodiment, the present invention provides processes for producing nanoparticulate solar control concentrate compositions. In these processes, the suitable and preferred nanoparticles, matrix materials, optional additives, and the suitable concentration ranges are as set forth above with respect to the compositions of the invention.

Preferably, the nanoparticles are dispersed within the matrix material. Dispersion, the process of deagglomerating the as-supplied nanoparticles to primary particles, may be accomplished by any suitable means. The clarity of the articles containing the nanoparticles, as demonstrated through haze measurements, for example, will suffer if the nanoparticles are not sufficiently deagglomerated.

Preferably, the dispersion process is a high shear melt mixing process in which the molten matrix material is combined with the nanoparticles and any optional components of the composition that may be present. Suitable high shear mixing equipment includes static mixers, rubber mills, Brabender mixers, Buss kneaders, single screw extruders, twin screw extruders, heated or unheated two-roll mills, and the like.

The precise processing conditions will depend on the chemical identity of the matrix material, however, and on the amount of nanoparticles to be incorporated into the matrix material. Those of skill in the art will be able to determine appropriate processing conditions and equipment. For example, International Appln. Publn. No. WO 01/00404 describes a method of dispersing the nanoparticles within the matrix material using a heated two-roll mill. This method is more preferred when the matrix material or the nanoparticulate solar control concentrate has a melt viscosity too high for efficient processing on other equipment, such as static mixers, rubber mills, Brabender mixers, Buss kneaders, single screw extruders, and twin screw extruders.

In addition, the level of the nanoparticles in the nanoparticulate solar control concentrate is a key parameter that affects the efficiency of the deagglomeration process. The melt viscosity increases with the level of nanoparticles, both of which are preferably sufficient to impart high shear stress during the dispersion process. Conversely, an inadequately low level of nanoparticles will not provide sufficiently high melt viscosity. As a result, the shear stress will also be inadequately low, and the as-supplied nanoparticles will not be efficiently deagglomerated to their primary particle size. It follows logically that the upper limit of the level of nanoparticles incorporated within the matrix material will be determined in part by the highest melt viscosity that can be tolerated by the selected dispersion process and equipment.

The matrix material may be dried and powdered or pelletized prior to any mixing step. The matrix material may also be mixed with the nanoparticles and the optional components in a dry blend, typically referred to as a "pellet blend" or "powder blend", for feeding into the mixing equipment. Alternatively, the matrix material, the nanoparticles and the optional components may be individually fed through two or more different feeders.

In a typical extrusion process, the matrix material, the nanoparticles, and the optional components, if present, may be fed into the back or "feed" section of the extruder. It may be advantageous, however, to feed the matrix material, the nanoparticles, and the optional components into two or more different locations of the extruder. For example, the matrix material may be fed into the back section of the extruder while the nanoparticles are fed into the front of the extruder near the die plate. The extruder temperature profile preferably allows the matrix material to melt under the processing conditions. The screw design preferably also imparts shear stress, and therefore heat, as it mixes the molten matrix material with the nanoparticles and other optional components. Preferably, the melt processing temperature of the matrix material or of the nanoparticle concentrate is within the range of about 50° C. to about 300° C. As noted above, however, the exact processing to conditions will depend on the chemical identity of the matrix material, the level of nanoparticles in the melt, and the like.

In preferred processes of the invention, a relatively large amount of nanoparticles is blended with a relatively small amount of matrix material to form a concentrate that has a relatively high level of nanoparticles. The concentrate is blended with a polymeric resin, which may be the same as or different from the matrix material, to produce a solar control composition with the desired, relatively low level of nanoparticles necessary to absorb the desired amount of infrared radiation. In some more preferred processes, the blend is produced in situ in a manufacturing process. For example, the nanoparticulate solar control concentrate may be added directly, as an additive, into the production processes described below for shaped articles, as an additive such as films and sheets. The suitable and preferred processing methods and conditions are as set forth above with respect to processes for compounding the nanoparticulate solar control concentrate compositions.

The suitable materials for the polymeric resin are as set forth above for the matrix material. Preferably, for optimal clarity, the matrix material is miscible with the polymeric resin. More preferably, the polymeric resin and the polymeric matrix material are equivalent.

It is contemplated, however, that a lower melting matrix material may be used, particularly in conjunction with higher melting polymeric resins, such as poly(ethylene terephthalate). The clarity of the final film or sheet is not expected to be unduly degraded in these instances, because of the relative thinness of the films and also because of the relatively low level of the matrix material to be incorporated within the final film or sheet composition.

A solar control composition according to the invention that is formed by a process of the invention may include from about 0.0001 weight percent to about 75 weight percent of nanoparticulate solar control concentrate and from about 99.9999 weight percent to about 25 weight percent of the polymeric resin. Preferably, the composition comprises from about 0.0001 weight percent to about 40 weight percent of the of nanoparticulate solar control concentrate and from about 99.9999 weight percent to about 60 weight percent of the polymeric resin. More preferably, the composition comprises from about 0.0001 weight percent to about 20 weight percent of the of nanoparticulate solar control concentrate and from about 99.9999 weight percent to about 80 weight percent of the polymeric resin. Still more preferably, the composition comprises from about 0.0001 weight percent to about 10 weight percent of the of nanoparticulate solar control concentrate and from about 99.9999 weight percent to about 90 weight percent of the polymeric resin.

The solar control compositions may include one or more optional additives. The suitable and preferred additives, and the suitable and preferred levels, are as set forth above with respect to the nanoparticulate solar control concentrates. In compounding the solar control compositions, the optional additives may be added separately or included with the matrix material, the nanoparticulate solar control concentrate, the polymeric resin, or to one or more of the matrix material, nanoparticulate solar control concentrate, or the polymeric resin.

The present invention also provides shaped articles, preferably in the form of films or sheets, comprising the compositions of the invention and the compositions made by the processes of the invention. The films and sheets of the invention may comprise any of the above mentioned matrix materials, polymeric resins, and optional additives. In addition, recycled polymeric materials may be used along with virgin materials in the matrix materials and polymer resins.

The difference between a film and a sheet is the thickness; however, there is no industry standard that defines the thickness at which a film becomes a sheet. For purposes of this invention, a film has a thickness of about 10 mils (0.25 millimeters (mm)), or less. Preferably, the film has a thickness of about 0.5 mils (0.012 mm) to about 10 mils (0.25 mm). More preferably, the film has a thickness of about 1 mil (0.025 mm) to about 5 mils (0.13 mm). For automotive applications, the film thickness may be preferably within the range of about 1 mil (0.025 mm) to about 4 mils (0.1 mm). For purposes of this invention, a sheet has a thickness of greater than about 10 mils (0.25 mm). Preferably, the sheet has a thickness of about 15 mils (0.38 mm) or greater. More preferably, the sheet has a thickness of about 30 mils, (0.75 mm), or greater.

Different physical properties are often desired from films and sheets, however. For example, a sheet may be required to be self-supporting, or a film may require resistance to puncture or tearing. Accordingly, in the present invention, different polymeric resins are preferred for use at different thicknesses.

Preferred polymeric resins for use in films include, without limitation, poly(ethylene terephthalate), polycarbonate, polypropylene, polyethylene, polypropylene, cyclic polyolefins, norbornene polymers, polystyrene, syndiotactic polystyrene, styrene-acrylate copolymers, acrylonitrile-styrene copolymers, poly(ethylene naphthalate), polyethersulfone, polysulfone, nylons, poly(urethanes), acrylics, cellulose acetates, cellulose triacetates, vinyl chloride polymers, polyvinyl fluoride, polyvinylidene fluoride, poly(vinyl butyral), ethylene-co-vinyl acetate, and the like. More preferably, the polymeric resin is biaxially oriented poly(ethylene terephthalate) film. Still more preferably, the poly(ethylene terephthalate) film is biaxially oriented.

Preferred matrix materials and polymeric resins for use in the sheets of the invention comprise independently selected polymers having a modulus of about 20,000 psi (138 MPa) or less, as measured by ASTM Method D-638. More preferably, the sheet comprises independently selected polymers having a modulus of about 15,000 psi (104 MPa) or less. Preferred examples of matrix materials and polymeric resins for use is in sheets include, for example, poly(ethylene-co-vinyl acetate); ethyl acrylic acetate (EM); ethyl methacrylate (EMAC); metallocene-catalyzed polyethylene; plasticized poly(vinyl chloride); ISD resins; polyurethane; acoustically modified poly(vinyl chloride), an example of which is commercially available from the Sekisui Company; plasticized poly(vinyl butyral); acoustically modified poly(vinyl butyral); and the like and combinations thereof.

Preferably, the melt processing temperature of the film and sheet compositions is from about 50° C. to about 300° C., and more preferably from about 100° C. to about 250° C. The film and sheet compositions generally have excellent thermal stability, which allows for processing at high enough temperatures to reduce the effective melt viscosity.

Poly(vinyl butyral) is a more preferred polymeric resin for sheets. Preferred poly(vinyl butyral) resins have a weight average molecular weight range of from about 30,000 to about 600,000 Daltons, preferably of from about 45,000 to about 300,000 Daltons, more preferably from about 200,000 to 300,000 Daltons, as measured by size exclusion chromatography using low angle laser light scattering. Preferable poly(vinyl butyral) materials comprise, on a weight basis, about 5 to about 30 percent, preferably about 11 to about 25 percent, and more preferably about 15 to about 22 percent hydroxyl groups, calculated as polyvinyl alcohol (PVOH). In addition, preferable poly(vinyl butyral) materials include about 0 to about 10 percent, preferably about 0 to about 3 percent residual ester groups, calculated as polyvinyl ester, typically acetate groups, with the balance being butyraldehyde acetal. The poly(vinyl butyral) may also include a relatively small amount of acetal groups other than butyral, for example, 2-ethyl hexanal, as described in U.S. Pat. No. 5,137,954. Poly(vinyl butyral) resin may be produced by aqueous or solvent acetalization, or by any other suitable means.

Preferably, the poly(vinyl butyral) contains at least one plasticizer. The total amount of plasticizer depends on the specific poly(vinyl butyral) resin and the desired properties. Suitable plasticizers are, for example, described in U.S. Pat. No. 3,841,890, U.S. Pat. No. 4,144,217, U.S. Pat. No. 4,276,351, U.S. Pat. No. 4,335,036, U.S. Pat. No. 4,902,464, U.S. Pat. No. 5,013,779, and WO 96/28504. Plasticizers commonly employed are esters of a polybasic acid or a polyhydric alcohol.

Particularly suitable plasticizers are triethylene glycol di-(2-ethyl butyrate), triethylene glycol di-2-ethylhexanoate, triethylene glycol di-n-heptanoate, oligoethylene glycol di-2-ethylhexanoate, tetraethylene glycol di-n-heptanoate, dihexyl adipate, dioctyl adipate, mixtures of heptyl and nonyl adipates, dibutyl sebacate, tributoxyethylphosphate, isodecylphenyl phosphate, triisopropylphosphite, polymeric plasticizers such as the oil-modified sebacid alkyds, and mixtures of phosphates and adipates, and adipates and alkyl benzyl phthalates. Generally between about 15 to about 80 parts of plasticizer per hundred parts of resin, and preferably about 25 to about 45 parts of plasticizer per hundred parts of resin, are used. This latter concentration is generally used with poly (vinyl butyral) resins containing 17 to 25 percent vinyl alcohol by weight.

Poly(ethylene-co-vinyl acetate) resins are also more preferred polymeric resins for use in sheets. Suitable poly(ethylene-co-vinyl acetate) resins include, without limitation, those that may be obtained from the Bridgestone Corporation, the Exxon Corporation, Specialized Technologies Resources, Inc. and E.I. du Pont de Nemours & Co. of Wilmington, Del. The poly(ethylene-co-vinyl acetate) resins preferably have a vinyl acetate level between about 10 to about 50 weight percent, more preferably between about 20 to about 40 weight percent, and still more preferably between about 25 to about 35 weight percent of the resin weight.

The poly(ethylene-co-vinyl acetate) resins may incorporate other unsaturated comonomers including, for example, methyl acrylate, methyl methacrylate, butyl acrylate, butyl methacrylate, glycidyl methacrylate, acrylic acid, methacrylic acid and mixtures thereof. The ethylene vinyl acetate copolymers of the present invention may incorporate a finite amount up to about 50 weight percent, and preferably incorporate a finite amount up to about 25 weight percent of another unsaturated comonomer. Still more preferably, however, the ethylene copolymers of the present invention incorporate about 0 weight percent of the other unsaturated comonomer, based on the total weight of the polymer. The other comonomer level is selected to provide poly(ethylene-co-vinyl acetate) resins having a modulus of about 20,000 psi or less, preferably having a modulus of about 15,000 psi or less.

Any of the plasticizers described above may be used with the poly(ethylene-co-vinyl acetate) resins. Generally, the plasticizer level within the poly(ethylene-co-vinyl acetate) resin composition does not exceed about 5 weight percent based on the total weight of the film or sheet composition.

Sheets comprising a polyethylene-co-vinyl acetate) resin preferably also comprise an organic peroxide as a crosslinking agent. Preferably, the organic peroxide has a thermal decomposition temperature of about 70° C. or greater, more preferably about 100° C. or greater, in a half-life of 10 hours. The selection of the appropriate organic peroxide may be performed by one skilled in the art with consideration of sheet-forming temperature, process for preparing the composition, curing (bonding) temperature, heat resistance of body to be bonded, storage stability, and the like. Preferably, the organic peroxide level is within the range of from about 0.1 weight percent to about 5 weight percent, based on the total weight of the film or sheet composition.

Alternatively, the poly(ethylene-co-vinyl acetate) resin may be cured by light. In this instance, the organic peroxide may be replaced with a photoinitiator or photosensitizer. Preferably, the level of the photoinitiator is within the range of from about 0.1 weight percent to about 5 weight percent, based on the total weight of the film or sheet composition.

The poly(ethylene-co-vinyl acetate) resin may also incorporate one or more radical generators. Preferably, the radical generators are materials which contain acryloyl(oxy) group containing compounds, methacryloyl(oxy) group containing compounds and/or epoxy group containing compounds for improvement or adjustment of various properties of the resin, such as, for example, mechanical strength, adhesion properties, optical characteristics such as transparency, heat resistance, light-resistance, rate of crosslinking and the like. These materials are preferably used at a level of about 50 weight percent or less, more preferably at a level of about 10 weight percent or less, and still more preferably at a level within the range of from about 0.1 weight percent to about 2 weight percent, based on the total weight of the film or sheet composition. Examples of the acryloyl(oxy) and methacryloyl (oxy) group containing compounds include generally derivatives of acrylic acid or methacrylic acid, such as esters and amides of acrylic acid or methacrylic acid. Examples of the ester residue include linear alkyl groups (e.g., methyl, ethyl, dodecyl, stearyl and lauryl), a cyclohexyl group, a tetrahydrofurfuryl group, an aminoethyl group, a 2-hydroxyethyl group, a 3-hydroxypropyl group, 3-chloro-2-hydroxtpropyl group. Further, the esters include esters of acrylic acid or methacrylic acid with polyhydric alcohol such as ethylene glycol, triethylene glycol, polypropylene glycol, polyethylene glycol, trimethylol propane or pentaerythritol. An example of the amide includes diacetone acrylamide. Examples of polyfunctional compounds include esters of plural acrylic acids or methacrylic acids with polyhydric alcohol such as glycerol, trimethylol propane or pentaerythritol. Examples of the epoxy group containing compounds include triglycidyl tris(2-hydroxyethyl)isocyanurate, neopentylglycol diglycidyl ether, 1,6-hexanediol diglycidyl ether, allyl glycidyl ether, 2-ethylhexyl glycidyl ether, phenyl glycidyl ether, phenol(ethyleneoxy)sub-5 glycidyl ether, p-tert-butylphenyl glycidyl ether, diglycidyl adipate, diglycidyl phthalate, glycidyl methacrylate and butyl glycidyl ether, and the like and mixtures thereof.

An adhesion control additive for controlling the adhesive bond between a glass rigid layer and the polymeric film or sheet, may also be included in the films or sheets comprising poly(ethylene-co-vinyl acetate) or poly(vinyl butyral). Adhesion control additives are generally alkali metal or alkaline earth metal salts of organic or inorganic acids. Preferably, they are alkali metal or alkaline earth metal salts of organic carboxylic acids having from 2 to 16 carbon atoms. More preferably, they are magnesium or potassium salts of organic carboxylic acids having from 2 to 16 carbon atoms. Specific examples of adhesion control additives include, for example, potassium acetate, potassium formate, potassium propanoate, potassium butanoate, potassium pentanoate, potassium hexanoate, potassium 2-ethylbutylate, potassium heptanoate, potassium octanoate, potassium 2-ethylhexanoate, magnesium acetate, magnesium formate, magnesium propanoate, magnesium butanoate, magnesium pentanoate, magnesium hexanoate, magnesium 2-ethylbutylate, magnesium heptanoate, magnesium octanoate, magnesium 2-ethylhexanoate and the like and mixtures thereof. The adhesion control additive is typically used in the range of about 0.001 to about 0.5 weight percent based on the total weight of the film or sheet composition.

Films and sheets of the invention may be made by any suitable process. For example, thin films may be formed by dipcoating as described in U.S. Pat. No. 4,372,311, by compression molding as described in U.S. Pat. No. 4,427,614, by melt extrusion as described in U.S. Pat. No. 4,880,592, by melt blowing as described in U.S. Pat. No. 5,525,281, or by other suitable processes. Polymeric sheets may be formed by extrusion, calendering, solution casting or injection molding, for example. One of ordinary skill in the art will be able to identify appropriate is process parameters based on the polymeric composition and on the method used for sheet or film formation.

Preferably, however, the films of the present invention are formed by solution casting or extrusion, and the sheets of the present invention are formed by extrusion. Extrusion is particularly preferred for formation of "endless" products, such as films and sheets, which emerge as a continuous length.

The sheets and films of the invention include multilayer laminates having two or more layers. The multilayer film and sheet structures may be formed by any suitable means, such as, for example, coextrusion, blown film, dipcoating, solution coating, blade, puddle, air-knife, printing, Dahlgren, gravure, powder coating, spraying, or other art processes. The individual layers may be joined together by heat, adhesive and/or tie layer, for example. Preferably, the multilayer films are produced through extrusion casting processes.

Many film and sheet formation methods, and extrusion processes in particular, can also be combined with a variety of post-extruding operations for expanded versatility. Such post-forming operations include altering round to oval shapes, blowing the film to different dimensions, machining, punching, stretching or orienting, rolling, calendering, coating, embossing, printing, radiation such as E-beam treatment to increase the Vicat softening point, and the like. The post extruding operations, together with the polymeric composition, the method of forming the polymer, and the method of forming the film or sheet, affect many properties, such as clarity, shrinkage, tensile strength, elongation at break, impact strength, dielectric strength and constant, tensile modulus, chemical resistance, melting point, heat deflection temperature, adhesion, and the like.

For example, films and sheets formed by any method may be oriented, uniaxially or biaxially, by stretching in one or both of the machine and transverse directions after formation according to any suitable methods. Preferably, the shrinkage of the oriented films and sheets is controlled by heat stabilization, that is, by holding the film or sheet in a stretched position and heating for a few seconds before quenching. This stabilizes the oriented film or sheet, which then may shrink only at temperatures above the heat stabilization temperature. Preferably, the oriented films or sheets shrink less than 2 percent in both directions after 30 minutes at 150° C.

Preferably, one or both surfaces of the polymeric film or sheet is treated to enhance adhesion. This treatment may take any suitable form, including, without limitation, adhesives, primers, such as silanes, flame treatments, plasma treatments, electron beam treatments, oxidation treatments, corona discharge treatments, chemical treatments, chromic acid treatments, hot air treatments, ozone treatments, ultraviolet light treatments, sand blast treatments, solvent treatments, and the like, and combinations thereof.

Preferably, the films and sheets of the present invention include a primer coating on one or both surfaces, more preferably both surfaces, comprising a coating of a polyallylamine-based primer. The polyallylamine-based primer and its application to a poly(ethylene terephthalate) polymeric film are described in U.S. Pat. Nos. 5,411,845; 5,770,312; 5,690,994; and 5,698,329, for example.

The film or sheet may also have a hard coat layer formed from an ultraviolet (UV) curing resin on one or both surfaces. Any suitable hard coat formulation may be employed. The hard coat may incorporate further additives or be modified to provide other desirable attributes, such as a high scratch-resistance.

The sheets and films of the present invention may have smooth surfaces. Preferably, however, sheets and films to be used as interlayers within laminates have at least one roughened surface to effectively allow most of the air to be removed from between the surfaces of the laminate during the lamination process. Rough surfaces on one or both sides of the extruded film or sheet may be provided by the design of the die opening and the temperature of the die exit surfaces through which the extrudate passes. Roughening may also be accomplished, however, by post-extrusion operations such as mechanically embossing the sheet after extrusion, or by melt fracture during extrusion of the sheet and the like.

The present invention also provides solar control laminates. In some embodiments, the solar control laminates comprise or consist essentially of at least one polymeric film or sheet of the present invention. The solar control laminates of the present invention may optionally include one or more additional layers, however, such as other polymeric films or sheets, which may be coated or uncoated. Optional coatings include, for example, the above mentioned metallized films and organic infrared absorbing materials. Such additional layer(s) preferably provide supplementary attributes, such as acoustical dampening, for example.

In some preferred embodiments, the additional layer(s) are flexible, to produce flexible solar control laminates. Preferably, the flexible layer(s) are selected from the group consisting of polycarbonate, polyurethane, polyvinylbutyral, polyethylene-co-vinyl acetate, acrylic, polymethylmethacrylate, polyvinyl chloride, polyester, and biaxially oriented poly(ethylene terephthalate). Particularly preferred materials for flexible layers include biaxially oriented poly(ethylene terephthalate), polyvinylbutyral, and polyethylene-co-vinyl acetate.

The flexible solar control laminates may be produced by any suitable process. For example, the film or sheet of the invention may be lightly bonded to the additional layer(s) of polymeric film through a nip roll bonding process. Optionally, the resulting solar control laminate may be subjected to moderate heating by passing it through a heating zone, such as an oven. Heating should be to a temperature sufficient to promote fusion bonding, that is, to cause the surfaces of the sheet or film to become tacky. The fusion bonding may be temporary or permanent. Suitable surface temperatures for the preferred sheets and films are within the range of about 50° C. to about 120° C., and preferably the surface temperature is about 65° C. Alternatively, suitable adhesives and/or primers may be used to enhance the bond strength between the sheet or film and the additional layer(s).

Alternatively, the additional layer(s) may be fed, along with the nanoparticle containing film or sheet, through nip rolls where the layers are merged together under moderate pressure to form a weakly bonded laminate. If desired, the nip rolls may be heated to promote the bonding process. The bonding pressure exerted by the nip rolls may vary with the composition of the layers to be bonded and the temperatures employed. Generally, the bonding pressure will be within the range of about 10 psi (0.7 kg/cm$^2$), to about 75 psi (5.3 kg/cm$^2$), and is preferably within the range of about 25 psi (1.8 kg/cm$^2$) to about 30 psi (2.1 kg/cm$^2$). After bonding, the laminate may be passed over a series of cooling cylinders to ensure that the laminate taken up on the roll is not excessively tacky.

Solar control laminates made through this process, or similar processes, are predicted to have sufficient strength to allow handling by converters who produce products incorporating the solar control laminates of the invention. Those of skill in the art will be aware that the processes described herein may be modified to produce a wide variety of laminate types.

In another embodiment, the additional layer(s) are rigid sheets. The rigid sheet may be glass, for example. The term "glass" as used herein includes window glass, plate glass, silicate glass, sheet glass, and float glass, colored glass, specialty glass which may, for example, include ingredients to control solar heating, glass coated with sputtered metals such as silver, for example, or glass coated with ATO and/or ITO, E-glass, Solex™ glass (available from PPG Industries of Pittsburgh, Pa.), Toroglass™, and the like. A typical glass type is 90 mil thick annealed flat glass and it is preferred to orient the tin side of the glass to the interlayer to achieve optimal adhesion. Alternatively, the rigid sheet may be rigid transparent plastic sheets, such as, for example, polycarbonate, acrylics, polyacrylate, cyclic polyolefins, such as ethylene norbornene polymers, metallocene-catalyzed polystyrene, and the like, and mixtures or combinations thereof. A metal or ceramic plate may likewise be used as a rigid sheet, if clarity is not required in the solar control laminate.

Preferred solar control laminates include structures comprising adjacent layers as follows:
rigid sheet/nanoparticle containing sheet or film;
rigid sheet/nanoparticle containing sheet or film/flexible layer;
rigid sheet/flexible layer/nanoparticle containing sheet or film;
rigid sheet/nanoparticle containing sheet or film/second rigid sheet;
rigid sheet/flexible layer/nanoparticle containing sheet or film/second flexible layer/second rigid sheet;
rigid sheet/nanoparticle containing sheet or film/second rigid sheet/flexible layer/third rigid sheet; and
rigid sheet/flexible layer/nanoparticle containing sheet or film/second nanoparticle containing sheet or film/optional second rigid sheet.

In some preferred embodiments, the layers of the solar control laminates, whether flexible or rigid, are laminated directly to one another so that they are adjoining.

For architectural uses and for uses in transportation such as automobiles, trucks, and trains, a preferred solar control laminate has two layers of glass, and, directly laminated to both glass layers, a single interlayer of the present invention. In these applications, the solar control laminate preferably has an overall thickness of about 3 mm to about 30 mm. The interlayer typically has a thickness of about 0.38 mm to about 4.6 mm, and each glass layer usually is at least 1 mm thick or thicker. The interlayer of the present invention is preferably adhered directly to the glass layers; thus, the glass is adjoining the interlayer, and an adhesive is preferably not required. Also preferred are multilayered solar control laminates, such as a five layer laminate of glass/interlayer/glass/interlayer/glass, a seven layer laminate of glass/interlayer/glass/interlayer/glass/interlayer/glass, and the like.

The rigid solar control laminates of the present invention may be produced through autoclave and non-autoclave processes such as, for example, a nip roll process. Essentially any lamination process may be used with the interlayers of the present invention.

EXAMPLES

The examples are presented for illustrative purposes only, and are not intended to limit the scope of the present invention in any manner.

Example 1

A pellet blend that incorporated 40 weight percent of NanoTek™ indium tin oxide (believed to be indium tin oxide with a nominal average particle size of 10 nm, and available from the NanoPhase Technologies Company of Romeoville, Ill.), 50 weight percent polyvinyl butyral (a medium viscosity grade of polyvinyl butyral with a hydroxyl number of 18 to 18.5), and 10 weight percent triethylene glycol bis(2-ethyl hexanoate) was prepared. The pellet blend was subjected to high shear, intensive melt mixing on a two roll mill heated to a temperature within the range of is 180° C. to 200° C. for 30 minutes. The melt was cast into slabs. The slabs were cooled to room temperature and then crushed to form discrete chips of a nanoparticulate solar control concentrate, which were subsequently dispersed in a polymeric resin.

Example 2

The discrete chips prepared in Example 1, above, are suspended in triethylene glycol bis(2-ethyl hexanoate) to provide a stable dispersion. A plasticized poly(vinyl butyral) composition is prepared by mixing a poly(vinyl butyral) with a hydroxyl number of 18.5 with the stable dispersion. The plasticized poly(vinyl butyral) composition is extruded, with a residence time in the extruder is within 10 to 25 minutes. The feed ratio of the stable dispersion and the dry poly(vinyl butyral) flake is 36:100 (wt:wt), resulting in an indium tin oxide level of about 0.40 weight percent based on the total weight of the plasticized poly(vinyl butyral) composition. An aqueous solution of potassium acetate and magnesium acetate (3:1) is injected during the extrusion to deliver a potassium concentration of 50 to 100 ppm. The melt temperature measured at the slot die is between 190° C. and 215° C.

The molten sheet exiting from the slot die is quenched in a water bath, yielding a self-supporting sheet that is passed through a dryer, where excess water is allowed to evaporate, and then through a relaxer, where "quenched in stresses" are substantially relieved. The sheeting is then chilled to less than 10° C., slit along the mid-point of the web width, and wound up into rolls. The die lips at extrusion are adjusted to give the sheeting immediately before slitting a flat cross-sectional thickness profile.

After slitting, two rolls of flat poly(vinyl butyral) sheet are wound up into rolls. The average thickness profile in each roll is 30 mils (762 μm). The roll width is 1.12 meters.

Example 3

The sheets from Example 2, above, (1 meter by 1.12 meters, (full width), are conditioned at 23% relative humidity (RH) at a temperature of 72° F. overnight. A glass/interlayer/glass pre-press assembly including a clear annealed float glass plate layer (1 meter by 1.12 meters by 2.5 mm thick), a conditioned sheet layer, and a second clear annealed float glass plate layer (1 meter by 1.12 meters by 2.5 mm thick) is placed in a vacuum bag and heated at 90 to 100° C. for 30 minutes, to remove any air contained between the layers of the glass/interlayer/glass assembly. The glass/interlayer/glass pre-press assembly is then heated at 135° C. for 30 minutes in an air autoclave at a pressure of 200 psig (14.3 bar). The air is then cooled without adding additional gas to maintain the pressure in the autoclave. After 20 minutes of cooling, when the air temperature is less than about 50° C., the excess pressure is vented, and the glass/interlayer/glass laminate is removed from the autoclave.

Example 4

The sheets from Example 2 (1 meter by 1.12 meter), and an uncoated poly(ethylene terephthalate) film, (1 meter by 1.12 meter), are conditioned overnight at 23% RH and 72° F. A pre-press assembly including an annealed float glass sheet layer (1 meter by 1.12 meter by 3 mm thick), the conditioned sheet layer, the conditioned poly(ethylene terephthalate) film layer, a thin Teflon® film layer, and a second annealed float glass layer (1 meter by 1.12 meter by 3 mm thick) is placed into a vacuum bag and heated at 90 to 100° C. for 30 minutes to remove any air contained between the layers of the pre-press assembly. The pre-press assembly is then heated and cooled in an air autoclave, as described in Example 3, above. The glass sheet/interlayer/polyester film/Teflon® film/glass sheet assembly is removed from the autoclave. Removal of the Teflon® film and the glass cover sheet provides a glass sheet/interlayer/polyester film laminate.

Example 5

A plasticizer solution of triethylene glycol bis(2-ethyl hexanoate) is prepared, which also incorporates the indium tin oxide concentrate of Example 1, 4 grams per liter of Tinuvin™ P and 1.2 grams per liter of Tinuvin™ 123 (products of the Ciba Company), and 8 grams per liter of octylphenol. The plasticizer solution is extruded with dry poly(vinyl butyral) flake so that the residence time in the extruder is within 10 to 25 minutes. The feed ratio of the plasticizer to the dry poly (vinyl butyral) flake is 38.5:100 (wt:wt), and the amount of nanoparticulate solar control concentrate in the plasticizer solution provides an indium tin oxide level of 0.25 weight percent based on the weight of the final total composition. An aqueous solution of potassium acetate and magnesium acetate (3:1) is injected during the extrusion to deliver a potassium concentration of 50 to 100 ppm. The melt temperature measured at the slot die is between 190° C. and 215° C.

The molten sheet exiting from the slot die is quenched in a water bath, yielding a self-supporting sheet that is passed through a dryer, where excess water is allowed to evaporate, and then through a relaxer, where "quenched in stresses" are substantially relieved. The sheeting is then chilled to less than 10° C., slit along the mid-point of the web width, and wound up into rolls. The die lips at extrusion are adjusted to give the sheeting immediately before slitting a flat cross-sectional thickness profile. After slitting, two rolls of flat poly(vinyl butyral) sheet are wound up into rolls. The average thickness profile in each roll is 30 mils (762 μm). The roll width is 1.12 meters.

Example 6

The sheets from Example 5, above, (1 meter by 1.12 meters at full width), are conditioned overnight at 23% RH and 72° F. Pre-press assemblies are laid up with a clear annealed float glass plate layer (1 meter by 1.12 meters by 2.5 mm thick), a conditioned sheet layer, and a second clear annealed float glass plate layer (1 meter by 1.12 meters by 2.5 mm thick). The glass/interlayer/glass assembly is placed into a vacuum bag and heated at 90 to 100° C. for 30 minutes to remove any air contained between the layers of the pre-press assembly. The pre-press assembly is then heated and cooled in an air autoclave, as described in Example 3, above. The glass/interlayer/glass laminate is removed from the autoclave.

Example 7

The sheets from Example 5 (1 meter by 1.12 meter) and an uncoated poly(ethylene terephthalate) film (1 meter by 1.12 meter) are conditioned overnight at 23% RH and 72° F. Prepress assemblies are laid up with a Solex® green glass sheet layer (1 meter by 1.12 meter by 3 mm thick), the conditioned sheet layer, the conditioned poly(ethylene terephthalate) film layer, a thin Teflon® film layer, and an annealed float glass layer (1 meter by 1.12 meter by 3 mm thick). The green glass sheet/interlayer/polyester film/Teflon® film/glass sheet assembly is placed into a vacuum bag and heated at 90 to 100° C. for 30 minutes to remove any air contained between the layers of the pre-press assembly. The pre-press assembly is then heated and cooled in an air autoclave, as described in Example 3, above. The green glass sheet/interlayer/polyester film/Teflon® film/glass sheet assembly is removed from the autoclave. Removal of the Teflon® film and the glass cover sheet provides a green glass sheet/interlayer/polyester film laminate.

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A method of making a polymer blend comprising the steps of:
    combining a polymeric matrix material and inorganic infrared absorbing nanoparticles via a high-shear melt mixing process to form a nanoparticulate solar control concentrate;
    providing a polymeric resin; and
    combining the nanoparticulate solar control concentrate and the polymeric resin to form the polymer blend;
    wherein the nanoparticulate solar control concentrate comprises
    a. about 70 wt % to about 50 wt % of the polymeric matrix material; and
    b. about 30 wt % to about 50 wt % of the inorganic infrared absorbing nanoparticles, said inorganic infrared absorbing nanoparticles having a nominal particle size of less than about 30 nm, and said inorganic infrared absorbing nanoparticles comprising antimony tin oxide, indium tin oxide, or a mixture of antimony tin oxide and indium tin oxide;
    wherein the weight percentages of the polymeric matrix material and of the inorganic infrared absorbing nanoparticles are based on the combined weight of the inorganic infrared absorbing nanoparticles and the polymeric matrix material.

2. The method of claim 1, wherein the inorganic infrared absorbing nanoparticles are present in the nanoparticulate solar control concentrate at a level of about 35 wt % to about 45 wt %, based on the total weight of the nanoparticulate solar control concentrate.

3. The method of claim 1, wherein the matrix material comprises a polymer selected from the group consisting of poly(ethylene terephthalate); polycarbonate; polypropylene; polyethylene; cyclic polyolefins; norbornene polymers; polystyrene; styrene-acrylate copolymers; acrylonitrile-styrene copolymers; poly(ethylene naphthalate); polyethersulfone; polysulfone; polyamides; poly(urethanes); acrylics; cellulose acetates; cellulose triacetates; vinyl chloride polymers; polyvinyl fluoride; polyvinylidene fluoride; poly(vinyl butyral); poly(ethylene-co-vinyl acetate); ethyl acrylic acetate; ethyl methacrylate; metallocene-catalyzed polyethylene; ISD resins; and copolymers thereof, and mixtures thereof.

4. The method of claim 1, wherein the inorganic infrared absorbing nanoparticles are dispersed in the matrix material.

5. The method of claim 1, wherein the nanoparticulate solar control concentrate and the polymeric resin are combined in an extrusion process.

6. The method of claim 1, wherein the polymeric resin comprises a polymer selected from the group consisting of poly(ethylene terephthalate); polycarbonate; polypropylene; polyethylene; cyclic polyolefins; norbornene polymers; polystyrene; styrene-acrylate copolymers; acrylonitrile-styrene copolymers; poly(ethylene naphthalate); polyethersulfone; polysulfone; polyamides; poly(urethanes); acrylics; cellulose acetates; cellulose triacetates; vinyl chloride polymers; polyvinyl fluoride; polyvinylidene fluoride; poly(vinyl butyral); ethylene-co-vinyl acetate; ethyl acrylic acetate; ethyl methacrylate; metallocene-catalyzed polyethylene; ISD resins; and copolymers thereof, and mixtures thereof.

7. A method of making a shaped article, said method comprising the steps of
    a. providing a polymer blend obtainable by the method of claim 1; and
    b. forming the shaped article from the polymer blend.

8. The method of claim 7, wherein the article is formed by an extrusion process.

* * * * *